Jan. 10, 1967   J. R. SHIPP   3,297,107
BAR SERVICE APPARATUS
Filed June 19, 1964   5 Sheets-Sheet 1

INVENTOR.
JAMES R. SHIPP
BY Herbert E. Kidder
AGENT

Jan. 10, 1967  J. R. SHIPP  3,297,107

BAR SERVICE APPARATUS

Filed June 19, 1964  5 Sheets-Sheet 2

INVENTOR.
JAMES R. SHIPP
BY Herbert E. Kidder
AGENT

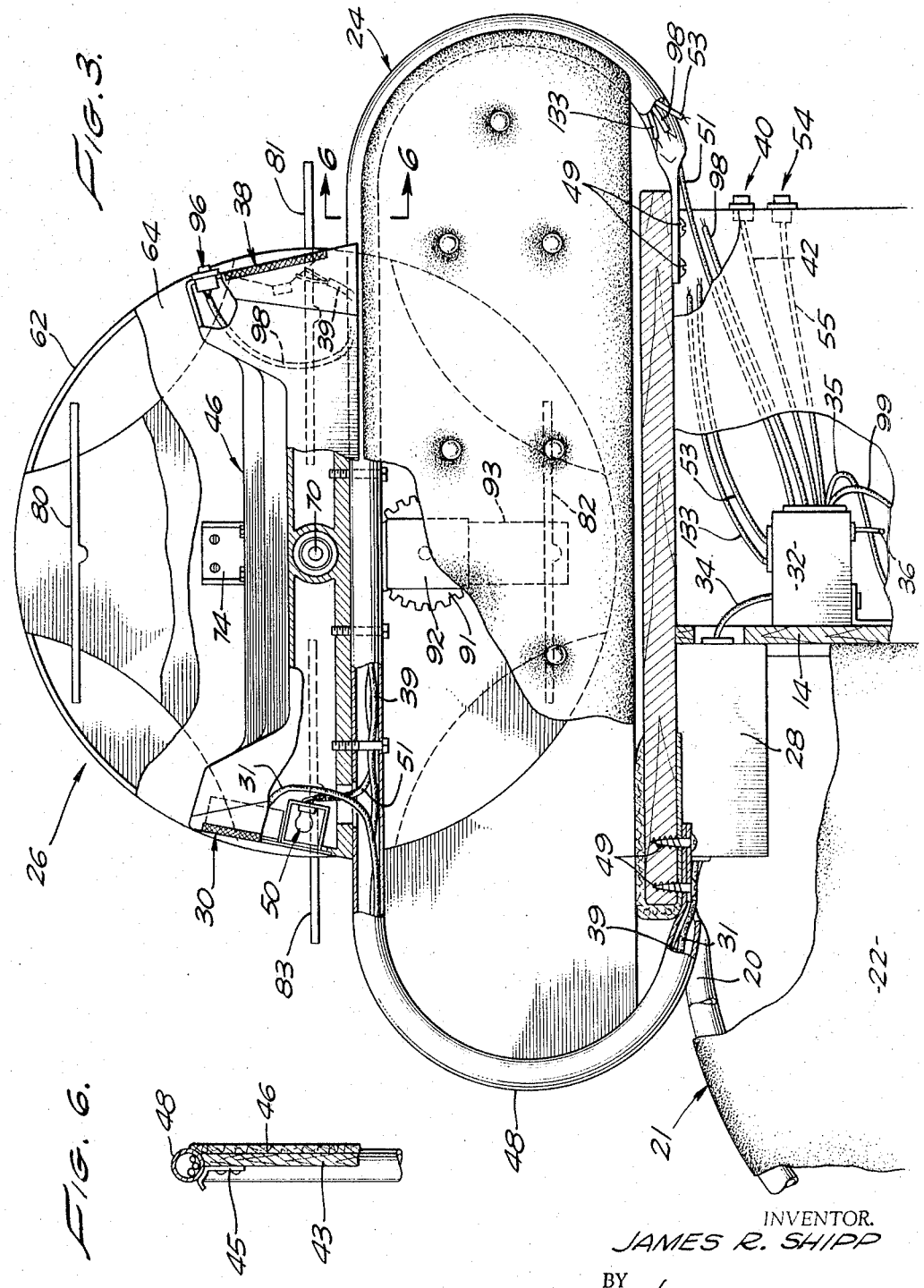

Jan. 10, 1967 J. R. SHIPP 3,297,107
BAR SERVICE APPARATUS
Filed June 19, 1964 5 Sheets-Sheet 4

INVENTOR.
JAMES R. SHIPP
BY Herbert E. Kidder
AGENT

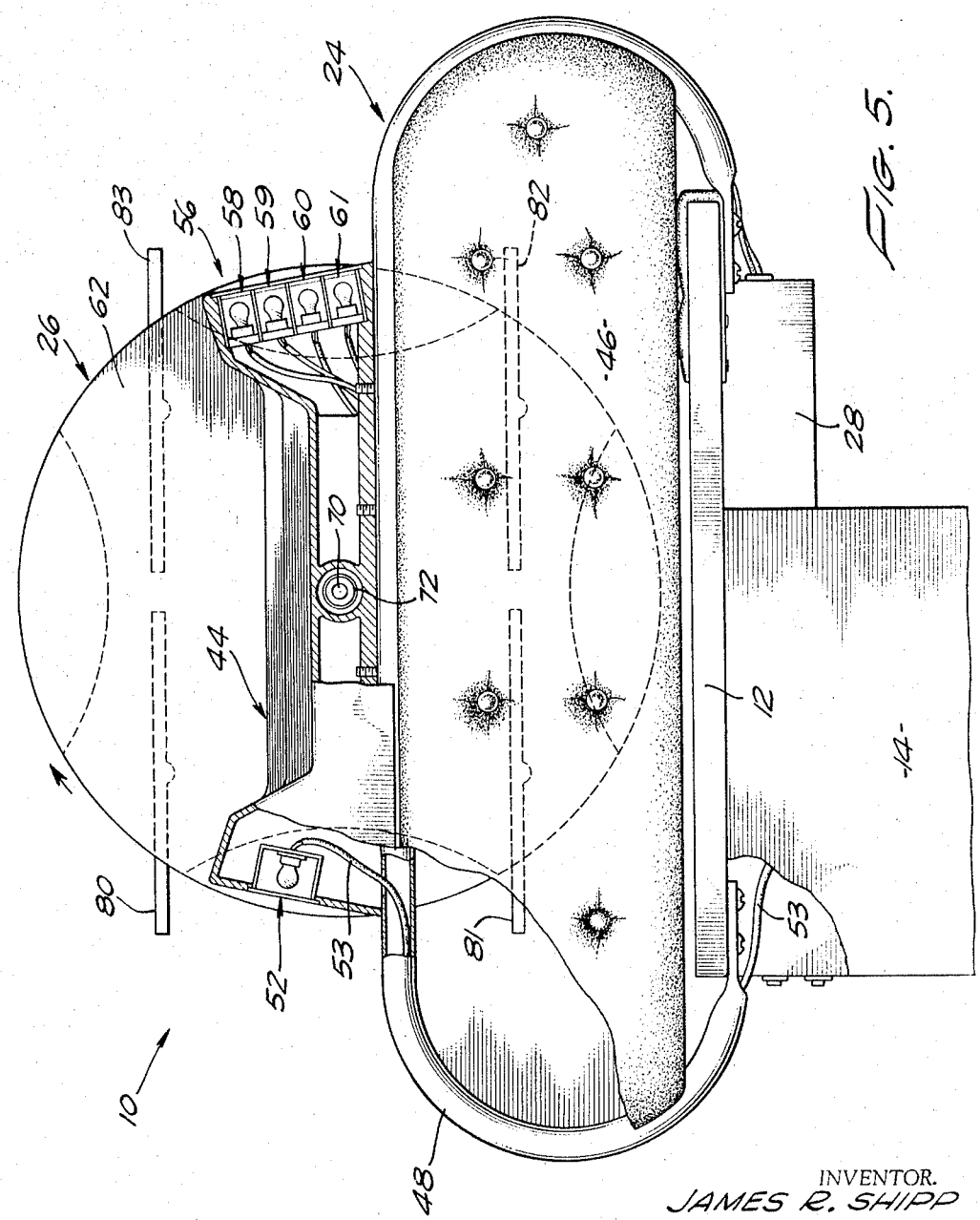

United States Patent Office
3,297,107
Patented Jan. 10, 1967

3,297,107
BAR SERVICE APPARATUS
James R. Shipp, 67—134 San Gabriel Circle,
Palm Springs, Calif. 92262
Filed June 19, 1964, Ser. No. 376,372
4 Claims. (Cl. 186—1)

The present invention relates to a new and unique service apparatus primarily for use in cocktail lounges, bars, and the like, where drinks are served to patrons seated at tables, although it could be used to good advantage in restaurants, cafes, coffee shops, and other places where food is served to patrons seated at tables or elsewhere than at the service counter. In general, the invention is applicable to any situation where patrons seated at tables place their orders with a waiter who, in turn, transmits the order to a bartender or other employee to be filled. Accordingly, the term "bartender" as used herein includes any employee at a service counter who fills orders for drinks or food placed by a waiter or waitress.

The primary object of the invention is to provide means for speeding and expediting the handling of orders placed with a bartender by one or more waiters serving patrons seated at tables.

Another object of the invention is to provide means enabling the waiter to place orders for drinks while the bartender is occupied serving other patrons seated at the bar, without waiting for the bartender to finish what he is doing at the moment and come over to take the order in person. An obvious advantage of this feature is that it frees the waiter from enforced idleness while waiting for the bartender, and enables him to devote all of his time to the more profitable occupation of serving the patrons seated at the tables. Equally important, the bartender is enabled to attend to the order placed by the waiter as soon as he is free to do so, without being placed under pressure by the awareness that one or more waiters is standing at the service counter waiting for him to take their orders. The bartender is thus able to work more efficiently at a steady, uniform rate, rather than in spurts, which tend to result in errors and fatigue.

Another important object of the invention has to do with the prevention of collusion between dishonest waiters and bartenders, who contrive to falsify sales records pertaining to the number of drinks served and the amount of cash collected for the same, and then pocket the difference. For example, cash register slips for drinks are frequently left behind by patrons when they leave, and these slips may be picked up and re-used by the waiter the next time that an order for drinks of the same value is served to another table. In this case, the bartender, who is a partner in the collusion, either fails to ring up any amount on the cash register, or rings up a minimum transaction, the cash difference then being divided between the bartender and the waiter. This type of theft is not uncommon, and is always a troublesome problem, owing to the difficulty of detecting and proving that such collusion exists.

A further object of the invention, therefore, is to provide means for preventing collusion between dishonest employees by making it virtually impossible for them to perpetrate a fraud of this type without detection. In this connection, one object of the invention is to provide means for recording all orders placed with the bartender by the waiters, so that the recorded orders can be played back later for audit purposes.

Another object of the invention is to provide indicator means, preferably in the form of a red light visible throughout the cocktail lounge, which is lighted up when the waiter stands before the apparatus of the invention to place an order, showing that the order is being dictated (and recorded) in the proper manner. Failure of the said indicator lamp to light up while an order is being placed by the waiter would indicate that something is wrong, and would deter any waiter from trying to place an order without having the same recorded, as this would be clearly evident to everyone in the cocktail lounge, and the waiter would have no way of knowing whether or not he was being watched.

Still another object of the invention is to provide means whereby one bartender may serve several waiters, each of whom is able to ascertain immediately from any part of the cocktail lounge when an order of his has been filled and is ready to be served. Moreover, the waiter may pick up a tray of drinks from the apparatus of the invention without pausing to make sure that he has the right tray, as the invention includes means for distinctively identifying each tray as belonging to its respective waiter; and there is a distinctive, color-coded signal lamp for each waiter. Each waiter is thus enabled to know that when his particular signal lamp is lighted, there is a tray of drinks on the apparatus waiting for him.

These and other objects and advantages of the present invention will become apparent to those skilled in the art upon consideration of the following detailed description of the preferred embodiment thereof, reference being had to the accompanying drawings, wherein:

FIGURE 3 is a partially cut-away end view of the apparatus, as seen from 3—3 in FIGURE 2;

FIGURE 5 is an end view of the apparatus as seen from 5—5 in FIGURE 2;

FIGURE 6 is a fragmentary sectional view, taken at 6—6 in FIGURE 3;

Figure 1:
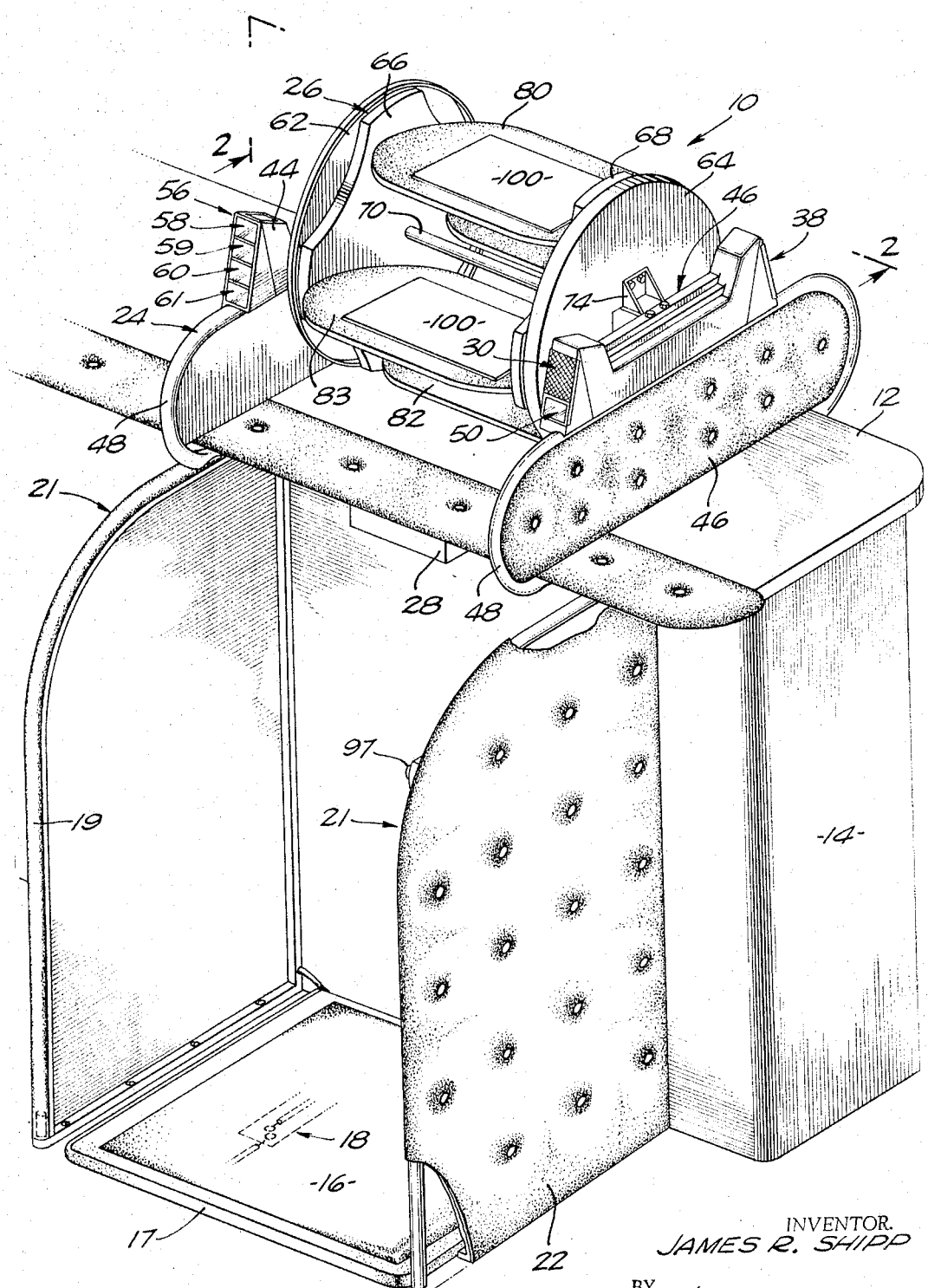
FIGURE 1 is a perspective view of an apparatus embodying the principles of the invention, as seen from the waiter's side of the service counter.

In FIGURES 1 to 7 of the drawings, the bar service apparatus of the present invention is designated in its entirety by the reference numeral 10, and is mounted on the horizontal counter top 12 of a service bar 14. On the floor, in front of the apparatus 10, is a platform, or pad 16, which denotes an order-placement station where a waiter is to stand when placing an order. The platform 16 is surrounded by a rectangular steel frame 17 which is secured to the floor, and mounted on the underside of the platform in a manner to be actuated when a waiter is standing thereon, is a contact switch 18, as shown in FIGURE 1. Projecting outwardly from the service bar 14 on opposite side of the platform 16 are two tubular steel frames 19 and 20, which are attached to the floor and to the underside of the overhanging edge of the counter top 12, forming parallel wings 21, between which the waiter stands. Attached to the frames 19 and 20 are panels of plywood or similar material, which are covered with tufted, plastic-coated fabric, 22, giving the exposed surfaces of the wings 21 an ornamental appearance in keeping with the rest of the furnishings in the cocktail lounge.

Mounted on the counter top 12 is a supporting frame 24, which holds a service wheel 26 that somewhat resembles a Ferris wheel. An audio-recorder 28, preferably in the form of a magnetic tape recorder, is enclosed within a box mounted on the underside of the counter top 12, and connected to this tape recorder is a microphone 30 which is positioned to pick up spoken orders dictated by a waiter standing on the platform 16. The microphone 30 is connected by a wire 31 to the tape recorder 28, and the latter is connected to a relay box 32 by a wire 34. The relay box 32 is preferably mounted on the bartender's side of the bar, as shown in FIGURE 3, and is connected by a first wire 35 to the contact switch 18 under the platform, and by a second wire 36 to an electrical outlet.

On the bartender's side of the apparatus is a speaker 38, which is connected by a wire 39 to the tape recorder 28. A pushbutton switch 40 on the bartender's side of the counter is connected by a wire 42 to the relay box 32, and the button 40 allows the bartender to play back the recorded orders so that he can fill the same.

The supporting frame 24 includes a pair of consoles 44 and 46 on each side of the apparatus, which are mounted on tubular steel frame members 48. The ends of the tubular steel members 48 are curved down and under the edges of the counter top 12, and are secured to the underside thereof by screws 49. Each of the tubular steel frames 48, together with the counter top 12, defines a flattened loop having semi-circular ends, and the space encompassed within this loop is filled by a panel 43 of plywood or the like, which is attached to the tube 48 by metal brackets 45. The outer surface of the plywood panel 42 is covered by a padded cover 47 of the same tufted, plastic-coated fabric material as that used on the outer surface of the wings 21.

Mounted on the front end of the right-hand console 46 below the microphone 30 is a visual indicator 50, preferably in the form of a red light, which is connected by a wire 51 to the relay box 32. On the back end of the left-hand console 44, where it is clearly visible to the bartender, is another signal lamp 52, which is connected by a wire 53 to the relay box 32. The signal lamp 52 lights up when a waiter steps onto the platform 16, closing the contact switch 18, and remains lighted by the action of a holding coil (not shown) in the relay box 32, until turned off by the bartender, who presses a pushbutton 54 to deenergize the holding coil in the box 32. The pushbutton 54 is connected to the relay box 32 by a wire 55.

Mounted on the front end of the left-hand console 44, where it will be clearly visible from anywhere in the table area of the cocktail lounge, is an array 56 of signal lamps 58, 59, 60 and 61, each of which is color-coded to designate a specific waiter, for the purpose of letting him know that an order placed by him has been filled and is waiting on the apparatus. For example, the signal lamps 58, 59, 60 and 61 might be colored green, yellow, blue and white, respectively, or any other visual identification might be used.

Figure 2:
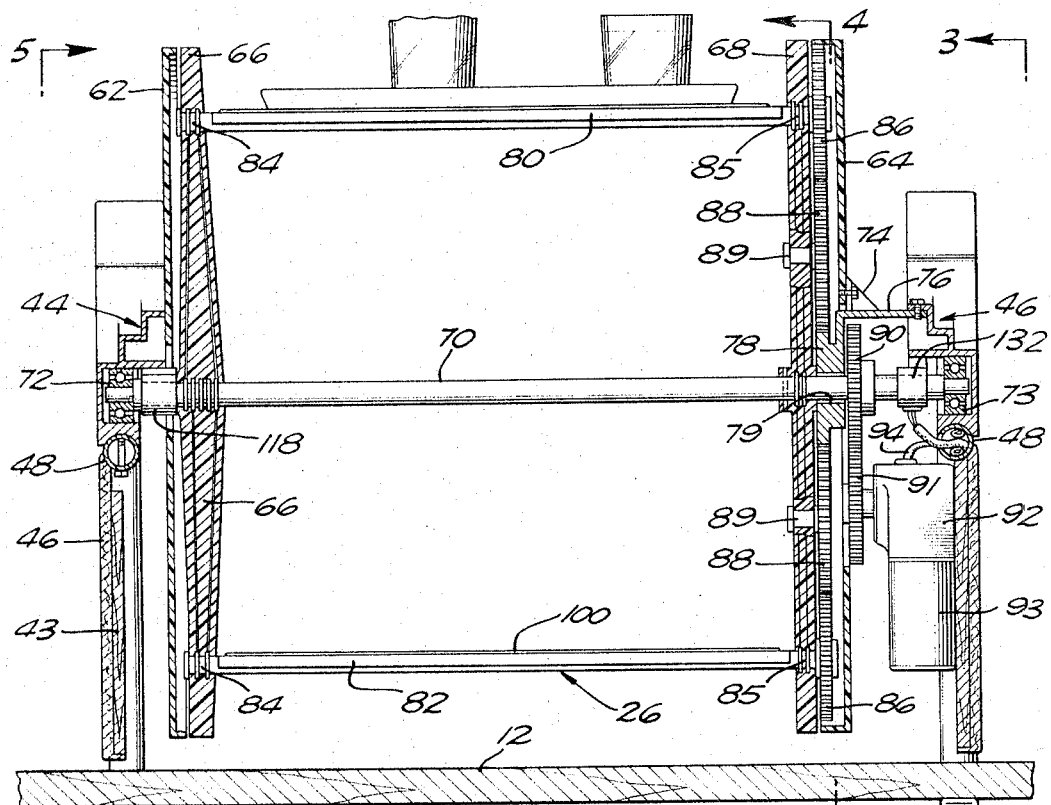
FIGURE 2 is a sectional view of the same, taken at 2—2 in FIGURE 1.
Figure 7:
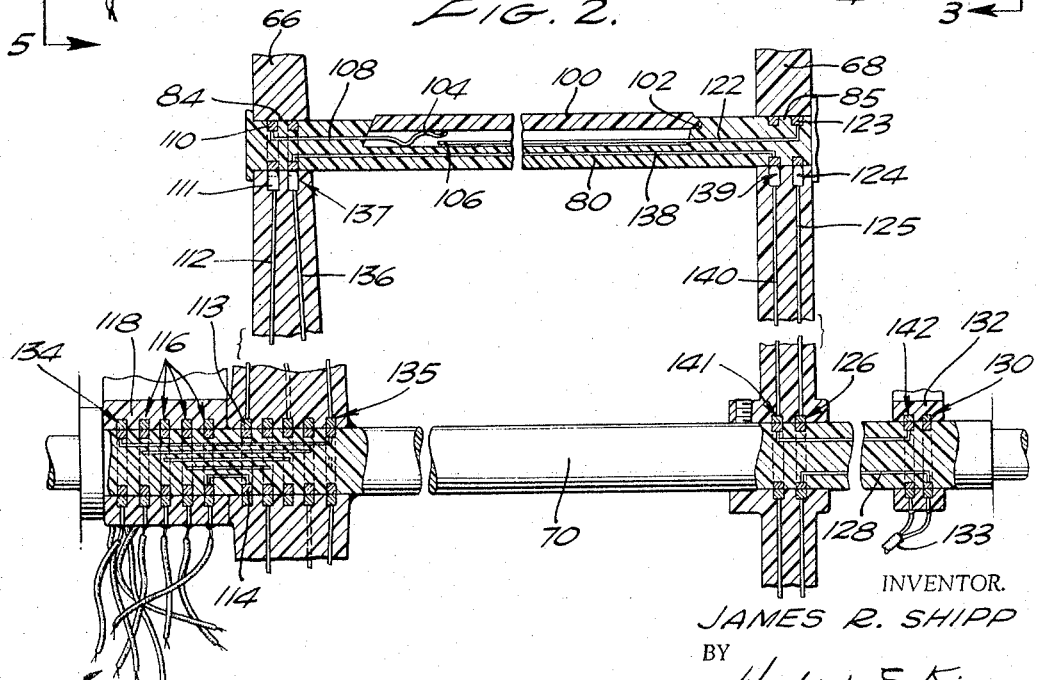
FIGURE 7 is a somewhat schematic drawing, showing a portion of the circuit of the apparatus, by means of which the signal lamps are lighted when a tray is placed on the apparatus.
Figure 4:
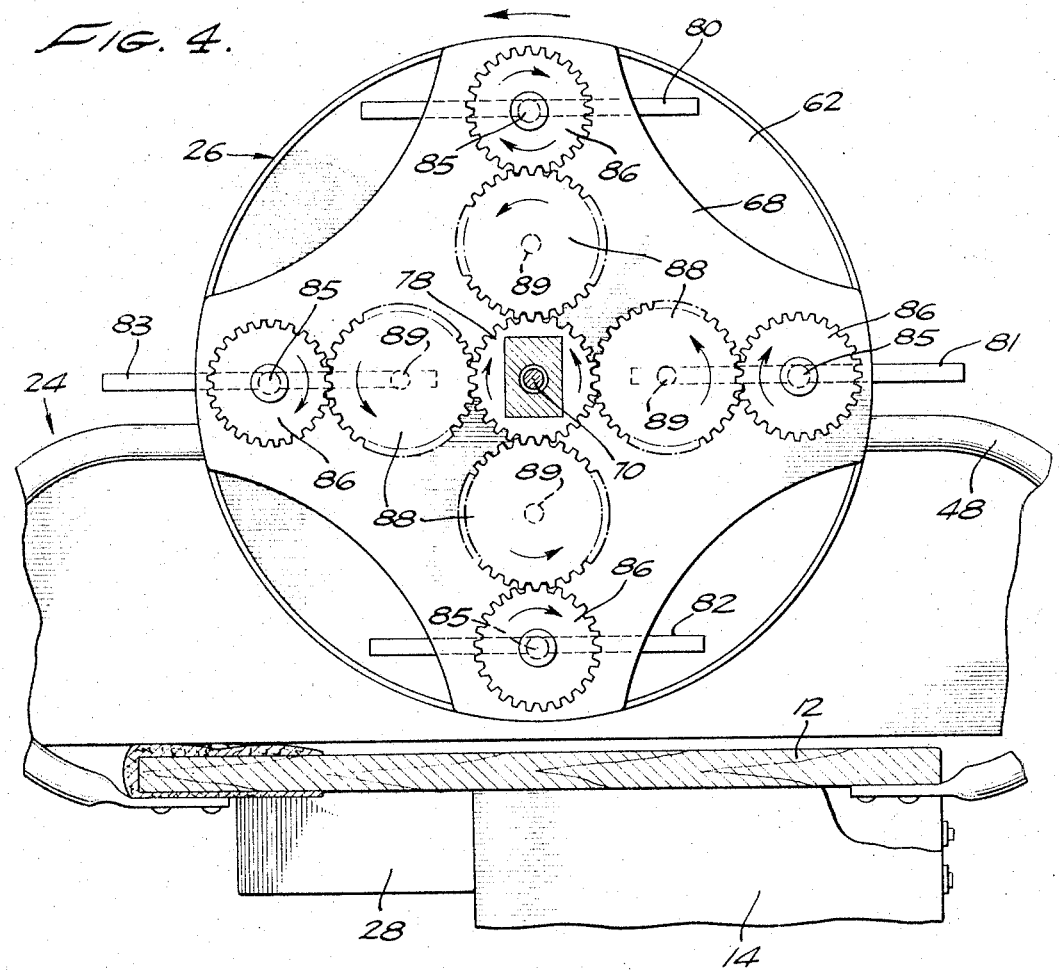
FIGURE 4 is a sectional view taken at 4—4 in FIGURE 2.

Mounted on opposite ends of the service wheel 26 are stationary cover plates 62 and 64, each of which encloses the corresponding end of the wheel. The service wheel comprises two laterally spaced end members 66 and 68, which are mounted on a horizontal shaft 70 near opposite ends thereof. The ends of the shaft 70 are rotatably supported in bearings 72 and 73, which are held in the consoles 44 and 46, respectively. The right-hand cover plate 64 is attached by a bracket 74 to a member 76 which is mounted on the right-hand console 46. Integral with the mounting member 76 is a stationary sun gear 78, which is concentric with the shaft 70. The shaft 70 passes through a hole 79 in the center of the sun gear 78, as best shown in FIGURE 2, and turns freely therein.

Mounted on the service wheel 26 and spaced apart equidistantly from one another around the axis of rotation are four-tray-supporting platforms 80, 81, 82 and 83, which extend between the end members 66 and 68. Trunnions 84 and 85 project from opposite ends of the platforms at the midpoint between the front and back edges thereof, and these are rotatably held in the end members. As best shown in FIGURE 2, trunnions 85 extend through the right-hand member 68 and project outwardly from the outer side thereof. Mounted on the projecting ends of these trunnions are pinion gears 86, which mesh with planet gears 88 that turn on shafts 89. Each of the pinion gears 86 and the stationary sun gear 78 have the same number of teeth, so that as the service wheel 26 revolves in a counter-clockwise direction, as viewed in FIGURE 4, the planet gears 88 are caused by the stationary sun gear 78 to revolve in a counter-clockwise direction, and this drives the pinion gears 86 in a clockwise direction at the same rate of rotation as the service wheel 26. In this way, the four tray-supporting platforms are maintained level as the wheel revolves, and drinks placed on the platforms will not be spilled by operation of the wheel.

The service wheel 26 is driven by means of a gear 90 which is fixedly mounted on the shaft 70 outside of the stationary sun gear 78. Meshing with the gear 90 is a drive gear 91 which is mounted on the output shaft of a speed-reduction gear box 92 that is integral with an electric motor 93. The motor 93 is connected by wires 94 to pushbuttons 96 on the bartender's side and 97 on the waiter's side, each of which is operable to start the motor 93 when the button is pushed. Pushbutton 96 is connected by a wire 98 to the relay box 32, while another wire 99 connects the pushbutton 97 to the relay box.

On each of the tray-supporting platforms 80, 81, 82, 83 is a base plate 100, which is hinged at 102 (see FIGURE 7) and this base plate is yieldingly supported so that it will be depressed by the weight of a loaded tray standing on the platform, thereby closing a switch contact 104 against a companionate contact 106. The switch contact 104 may be spring-loaded to press the base plate 100 upwardly, or the base plate may be held up by other resilient means. Preferably, the spring support for the base plate 100 is sufficiently stiff so that an empty tray will not close the switch, yet the additional weight of even one drink on the tray will cause the base plate to be depressed sufficiently to close the switch.

When the switch contact 104 is closed against contact 106, electrical current is carried along a wire 108 to a commutator slip-ring 110 which is engaged by a brush 111. The brush 111 is connected by a wire 112 to a contact ring 113 at the hub of the end member 66, and this is engaged in electrical contact by another contact ring 114 on the shaft 70. Contact ring 114 is connected by a wire to one of four axially spaced pairs of cooperating slip rings 116, the inner ring of which is mounted on the shaft 70, and the outer ring being mounted in a sleeve-like electrical connector 118, which surrounds the shaft. Each of the pairs of slip rings 116 is connected to one of the tray-supporting platforms 80, 81, 82, 83, so that when the contact switch 104, 106 thereof is closed, electric current is carried to the associated pair of slip rings 116, where it is picked up by one of a plurality of wires 120 going to the lights 58, 59, 60 and 61. Thus, one of the four lights 58, 59, 60 and 61 is lighted up whenever a loaded tray is standing on the base plate 100 of the associated tray-supporting platform.

Preferably, the platforms 80, 81, 82, 83 are color-matched with their respective signal lights 58, 59, 60, 61, so that a tray placed on the blue platform will light up the blue signal lamp; the yellow platform lights up the yellow lamp; while the green and white platforms light up the green and white lamps respectively. Each of the four colors is assigned to one waiter, and trays used by that waiter are preferably, although not necessarily, of the same color. Thus, the waiter whose color is white would have his orders placed on a white tray, which would be placed on the white platform of the service wheel 26, and thus would light up the white light 61. Any time that the white light shows, the waiter whose color is white knows that there is an order of drinks waiting on the service wheel to be picked up by him and delivered to one of his tables. The same applies for the other three colors.

The other contact 106 of the switch on each of the tray-supporting platforms is connected by a wire 122 to a commutator slip ring 123, which is engaged by a brush 124. The brush 124 is connected by a wire 125 to a pair of cooperating slip rings 126, and these are connected by a wire 128 to another pair of slip rings 130, the inner rings of which are mounted on the shaft 70, whereas the outer ring is mounted on a sleeve-like electrical connector 132 surrounding the shaft. The outer ring 130 is connected to one of two conductors in a wire 133, which leads to a relay box 32. The circuit to the lights 58, 59, 60 and 61 is completed through contact rings 134 and electrical connections 135, 136, 137, 138, 139, 140, 141, 142 and the other conductor of wire 133 to relay box 32.

The operation of the apparatus 10 is believed to be more-or-less self-evident from the foregoing description. The waiter who has taken an order from patrons seated at one of his tables approaches the order placement station, and steps onto the platform 16, thereby closing the switch 18. This starts the tape recorder 28, and at the same time causes the visual indicator lamp 50 to light up, showing that the tape recorder is operating. The waiter dictates his order into the microphone 30, and the order is recorded on tape. At the same time, the signal lamp 52 on the bartender's side of the apparatus is lighted up and remains lighted, by virtue of the action of a holding coil in the relay box 32. The bartender, who may be busily occupied in taking care of patrons at the bar, sees the light 52, and knows that there is an order for him to fill as soon as he is free.

When the bartender becomes disengaged, he steps over to the apparatus, and presses the pushbutton 54, which turns off the light 52. He then presses the pushbutton 40, causing the tape recorder 28 to play back the order through the speaker 38. If the waiter has placed an empty tray on his assigned platform on the wheel 26, the bartender presses the pushbutton 96, which causes the service wheel 26 to revolve until the tray is brought around to his side of the counter. The bartender fills the order, and places the tray on the assigned platform. This causes the corresponding signal lamp of the group 56 to light up, which signals the waiter that there is a tray of drinks waiting for him on the apparatus. If, when the waiter comes up to the service wheel 26 to pick up his order, the tray is on the platform on the other side of the wheel, or is inconveniently located for him to remove it from the wheel, he presses the pushbutton 97, which rotates the service wheel 26 until the tray is brought around to a convenient location for him to remove it from the platform.

At the end of the day, the recorded tape is removed from the recorder 28, and is transcribed for audit purposes. The dollar value of all orders placed with the bartender by the waiters serving patrons seated at tables can thus be totaled, and this should correspond closely with the total receipts for the day. Since the red light visual indicator 50 lights up at all times when the tape recorder 28 is operating, and this is clearly visible throughout the cocktail lounge, it is immediately apparent to anyone seated on the premises when an order is being surreptitiously placed without being recorded, as by a waiter standing to one side of the apparatus. Since the waiter has no way of knowing when someone may be watching him, this makes the danger of detection too great to be an attractive risk, and as a result, theft by collusion among dishonest employees is reduced almost to the vanishing point.

The increased working efficiency made possible by freeing the waiters from enforced idleness while waiting for the bartender to come over to take an order, enables the waiters to devote more time to clearing tables, taking orders, emptying ash trays, and numerous other duties. On the other hand, the bartender is enabled to work at a steady rate, without being rushed at some times and idle at others, with less fatigue and fewer errors. Also, the chance of errors is minimized by enabling the bartender to play back the order as many times as may be necessary to get it correct.

Instead of a "Ferris wheel" type of construction, the service wheel 26 could be made in the form of a turntable, rotating about a vertical axis, in which case the drive motor 93 could be dispensed with, if desired. Alternatively, a plurality of stationary, tray-supporting platforms might be arranged side-by-side on the counter top 12, with each of said tray-supporting platforms operating a signal lamp such as the lamps 58, 59, 60 and 61, and otherwise using the principles of the invention to record spoken orders, while at the same time causing an indicator device to denote that the tape recorder is being operated.

Figure 8:
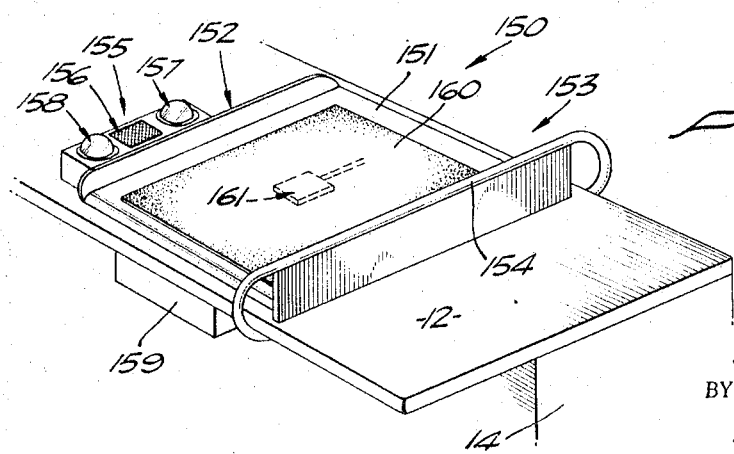
FIGURE 8 is a perspective view of another form of the invention that might be used in a cocktail lounge having only one waiter, instead of several.

FIGURE 8 shows a simplified form of the invention for use in cocktail lounges or other establishments where there is only one waiter serving patrons seated at tables. This second embodiment of the invention is designated generally by the reference numeral 150, and comprises a flat, generally rectangular tray-receiving platform 151, which rests directly on the counter top 12 and extends substantially across the full width thereof. On opposite sides of the platform are upstanding, parallel sides 152 and 153, the latter having a tubular steel frame member 154 extending across the counter top, with its ends curved downwardly and inwardly, and attached to the underside of the counter top.

Mounted on the outside of the left-hand side 152 is a console 155, upon which are mounted a combination microphone-speaker 156, a red dome-lite 157, and green or white dome-lite 158. The red dome-lite 157 corresponds to lamp 50 on the apparatus 10 (FIGS. 1–7), and lights up when the tape-recorder 159 is operating. The tape-recorder 159 may be mounted on the underside of the counter top 12, as shown. The white or green dome-lite 158 corresponds to one of the lights 58, 59, 60, 61 of the preceding embodiment, and its purpose is to signal the waiter that an order is waiting for him.

Covering the center of the platform 151 is a flat, rectangular, base plate, or pad 160, which is resiliently supported on the platform, and is adapted to be depressed slightly by the weight of a loaded tray standing thereon. Under the pad 160 is a switch 161, which is closed when the pad is depressed by a tray, and which is connected into the circuit to cause the dome-lite 158 to light up.

In this embodiment, as in the preceding one, there is a platform on the floor (not shown) upon which the waiter steps to start up the tape recorder 159 and cause the red dome-lite 157 to light up. There is also a pushbutton switch (not shown) on the bartender's side of the counter for playing the recorded order back.

The operation of the apparatus 150 is substantially the same as in the preceding embodiment. The waiter steps upon the platform on the floor, dictates his order into the microphone 156, and returns to his tables. The bartender plays back the recorded order, fills the order and places the loaded tray on the pad 160. This closes the switch 161 and lights up the dome-lite 158, thereby signalling the waiter that an order is waiting for him. At the end of the day, the recorded tape is removed from the tape recorder 159, and is played back for audit purposes.

While I have shown and described in considerable detail what I believe to be the preferred form of my invention, it will be understood by those skilled in the art that various changes may be made in the shape and arrangement of the various parts without departing from the broad scope of the invention as defined in the following claims.

I claim:

1. A bar service apparatus for use on a counter top to expedite the handling of orders by a bartender for a plurality of waiters serving patrons seated at tables, comprising:
- a wheel supported on said counter top for rotation about a horizontal axis;
- a plurality of tray-supporting platforms on said wheel, each of said platforms having means identifying it as being the platform assigned to one of said waiters;
- means for maintaining said platforms level as said wheel revolves;
- normally-open switch means associated with each of said platforms, said switch means being closed by the weight of a loaded tray standing on the platform;
- visual signal means actuated by said switch means when the latter is closed, to show that there is a tray waiting on one of said platforms for the waiter to whom it is assigned; and
- means operable by either the bartender or the waiter for driving said wheel to bring a tray around to a convenient location with respect to the operator.

2. A bar service apparatus for use on a counter top to expedite the handling of orders by a bartender for a plurality of waiters serving patrons seated at tables, comprising:
- a plurality of tray-supporting platforms mounted on said counter top, each of said platforms having means identifying it as being the platform assigned to one of said waiters;
- switch means associated with each of said platforms, said switch means being closed by the weight of a loaded tray standing thereon; and
- visual signal means actuated by said switch means when the latter is closed to show that there is a tray waiting on one of said platforms for the waiter to whom it is assigned.

3. A bar service apparatus for use on a counter top to expedite the handling of orders by a bartender for a plurality of waiters serving patrons seated at tables, comprising:
- a supporting frame mounted on said counter top;
- a wheel comprising a pair of axially spaced end members supported on said frame for rotation about a common horizontal axis;
- a plurality of tray-supporting platforms disposed between said end members and spaced apart equidistantly from one another about the axis of rotation;
- each of said platforms having trunnions projecting from opposite ends thereof, said trunnions being journaled in said end members;
- means on one of said end members engaging the trunnions journaled thereon, for holding said platforms level as said wheel revolves;
- switch means associated with each of said platforms, said switch means being closed by the weight of a loaded tray standing thereon;
- visual signal means actuated by said switch means to show that there is a tray waiting on one of said platforms for the waiter to whom it is assigned; and
- means operable by either the bartender or the waiter for driving said wheel to bring a tray around to a convenient location with respect to the operator.

4. A bar service apparatus for use on a counter top to expedite the handling of orders by a bartender for a plurality of waiters serving patrons seated at tables, comprising:
- a supporting frame mounted on said counter top;
- a wheel comprising a pair of axially spaced end members supported on said frame for rotation about a common horizontal axis;
- a plurality of tray-supporting platforms disposed between said end members and spaced apart equidistantly from one another about the axis of rotation;
- each of said platforms having trunnions projecting from opposite ends thereof, said trunnions being journaled in said end members;
- a stationary sun gear mounted on said frame adjacent one of said end members, said sun gear being concentric with the axis of rotation of said wheel;
- a plurality of planet gears journaled on said one end member, said planet gears meshing with said stationary sun gear;
- a pinion gear mounted on each of said trunnions journaled in said one end member, said pinion gears meshing with said planet gears;
- said pinion gears and said sun gear each having the same number of teeth, whereby said platforms are maintained level as said wheel revolves; and
- means for driving said wheel.

References Cited by the Examiner
UNITED STATES PATENTS

| | | | |
|---|---|---|---|
| 2,598,394 | 5/1952 | Kilgore | 174—100.1 |
| 2,615,993 | 10/1952 | Carter | 174—100.1 |

EVON C. BLUNK, *Primary Examiner.*

H. C. HORNSBY, *Assistant Examiner.*